United States Patent [19]

Gartland et al.

[11] Patent Number: 4,675,493
[45] Date of Patent: Jun. 23, 1987

[54] GAS-CONSTRICTED ARC NOZZLE

[75] Inventors: Thomas J. Gartland, Huntington Station; Adrian I. Papanide, Jackson Heights, both of N.Y.

[73] Assignee: Eutectic Corporation, Flushing, N.Y.

[21] Appl. No.: 850,690

[22] Filed: Apr. 11, 1986

Related U.S. Application Data

[63] Continuation-in-part of Ser. No. 824,525, Jan. 31, 1986.

[51] Int. Cl.$^4$ .................................................. B23K 9/16
[52] U.S. Cl. ..................................... 219/74; 219/69 R; 219/136
[58] Field of Search ................ 219/70, 74, 75, 137.42, 219/137.2, 68, 69 R, 121 PS, 121 PD, 69 W; 266/48

[56] References Cited

U.S. PATENT DOCUMENTS 3,576,423  4/1971  Bernard et al. ...................... 219/136
4,354,088  10/1982  Rehrig ................................. 219/75

FOREIGN PATENT DOCUMENTS 51405  2/1983  Bulgaria .
10350  1/1980  Japan ............................. 219/137.43
167083  10/1983  Japan ............................. 219/137.43
2116100  9/1983  United Kingdom ........... 219/137.42

Primary Examiner—E. A. Goldberg
Assistant Examiner—C. M. Sigda
Attorney, Agent, or Firm—Hopgood, Calimafde, Kalil, Blaustein & Judlowe

[57] ABSTRACT

An electric-arc discharge device includes an annular gas-flow nozzle surrounding the discharge electrode, the nozzle being configured for discharging gas flows at trans-sonic to supersonic velocity, with circumferential uniformity of the gas flow around the axis of the electrode, and directed downstream to surround and radially inwardly confine and shape the arc. The trans-sonic speeds of gas discharge are the result of special annular gas-nozzle design and suitable pressure of gas supply thereto, whereby a region of criticality characterizes gas flow within the nozzle, i.e., prior to discharge at trans-sonic speeds, the discharge being around the electrode and with such thrusting momentum as to establish shaping confinement and directional stability of the region of electric-arc development.

28 Claims, 10 Drawing Figures

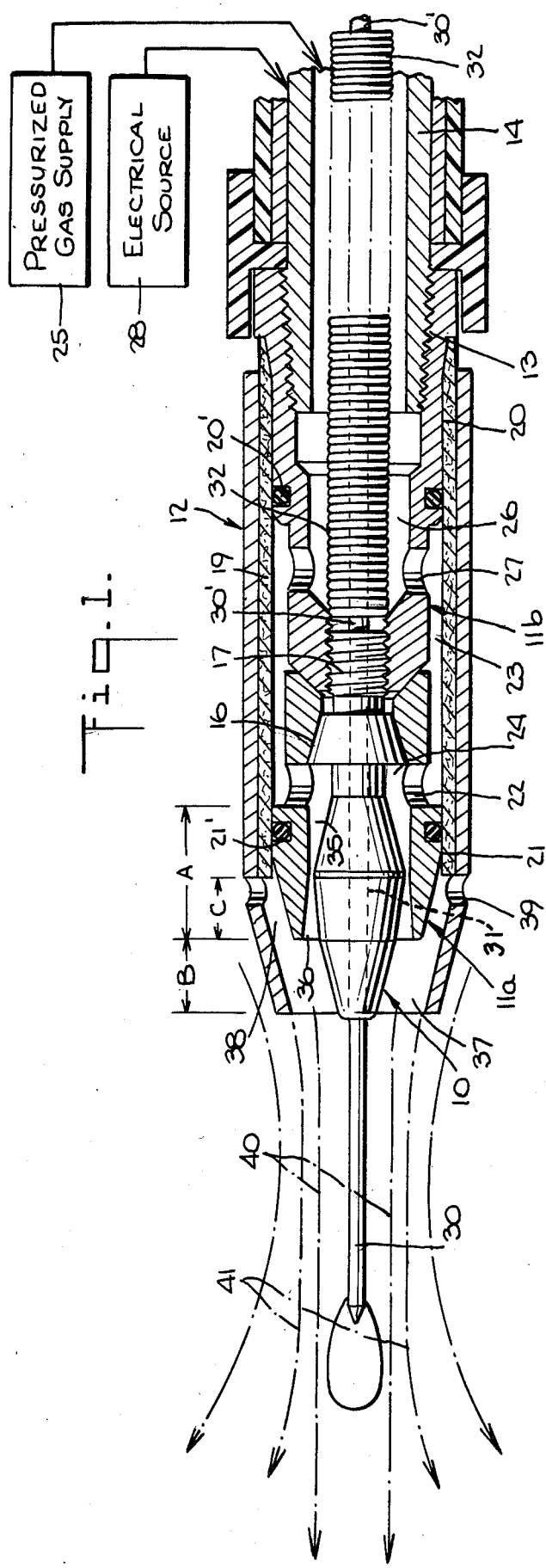
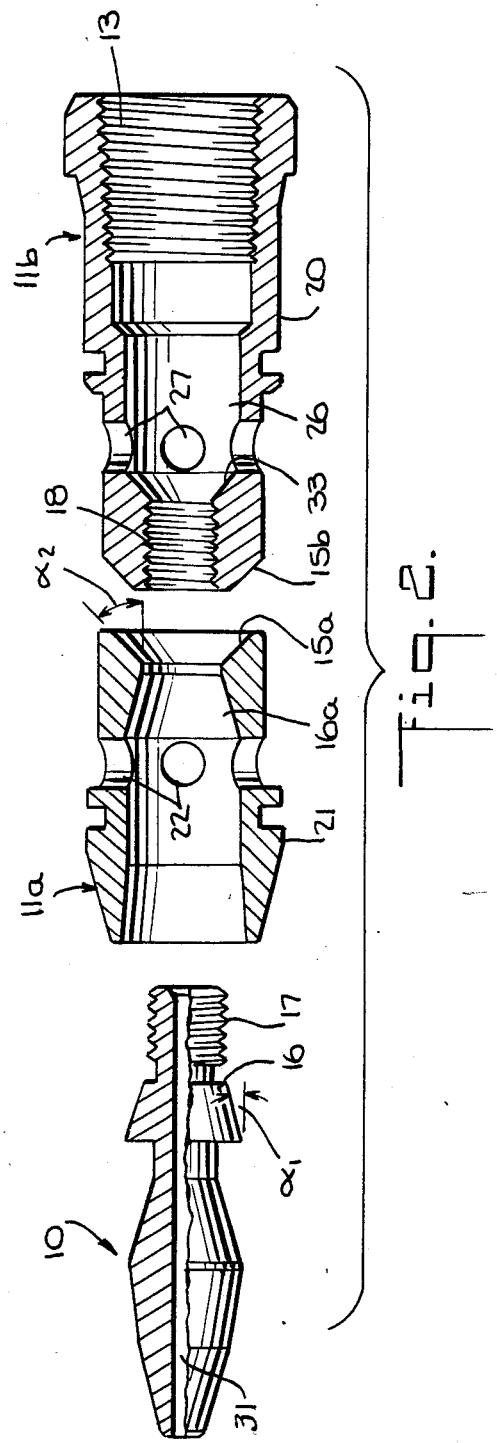

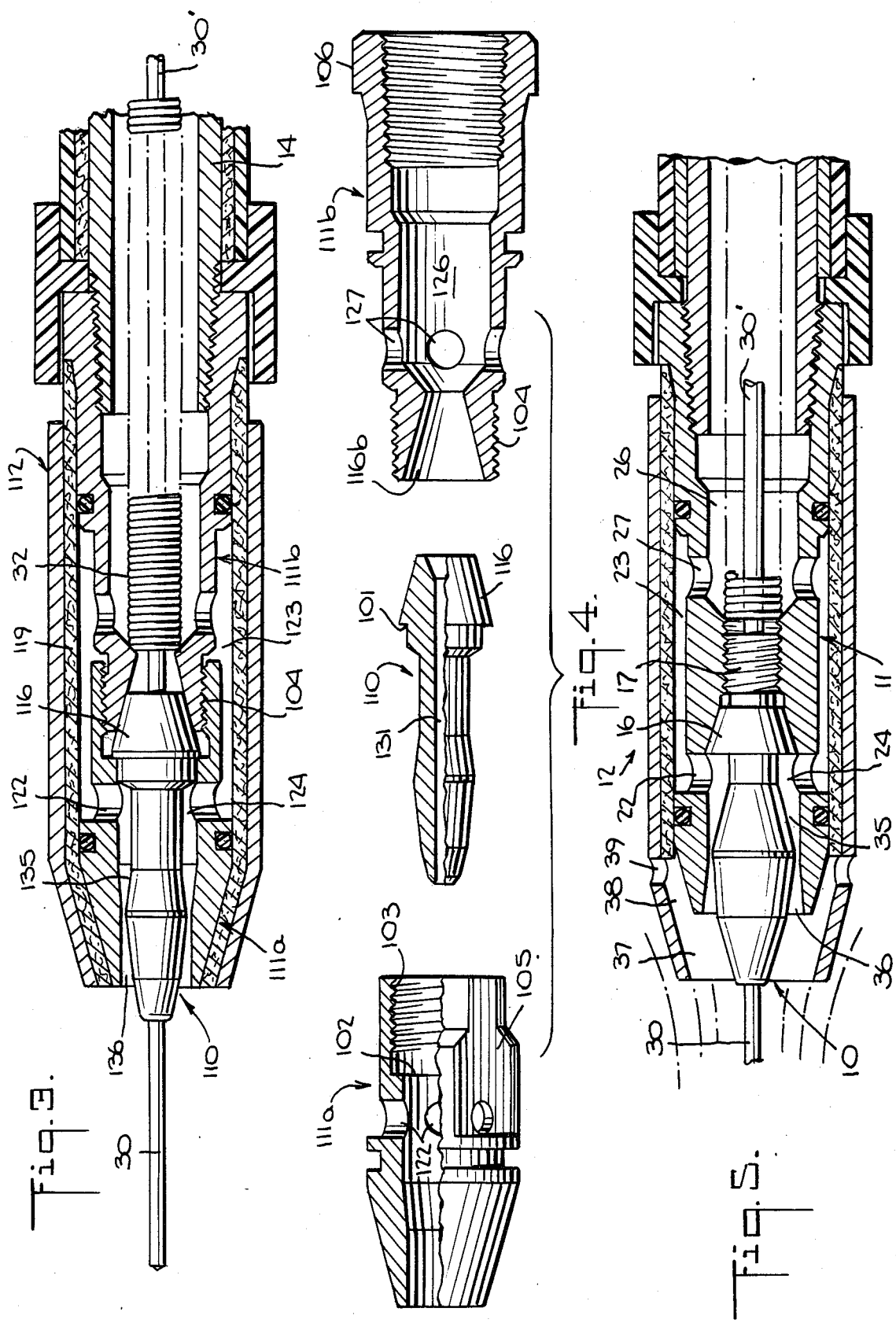

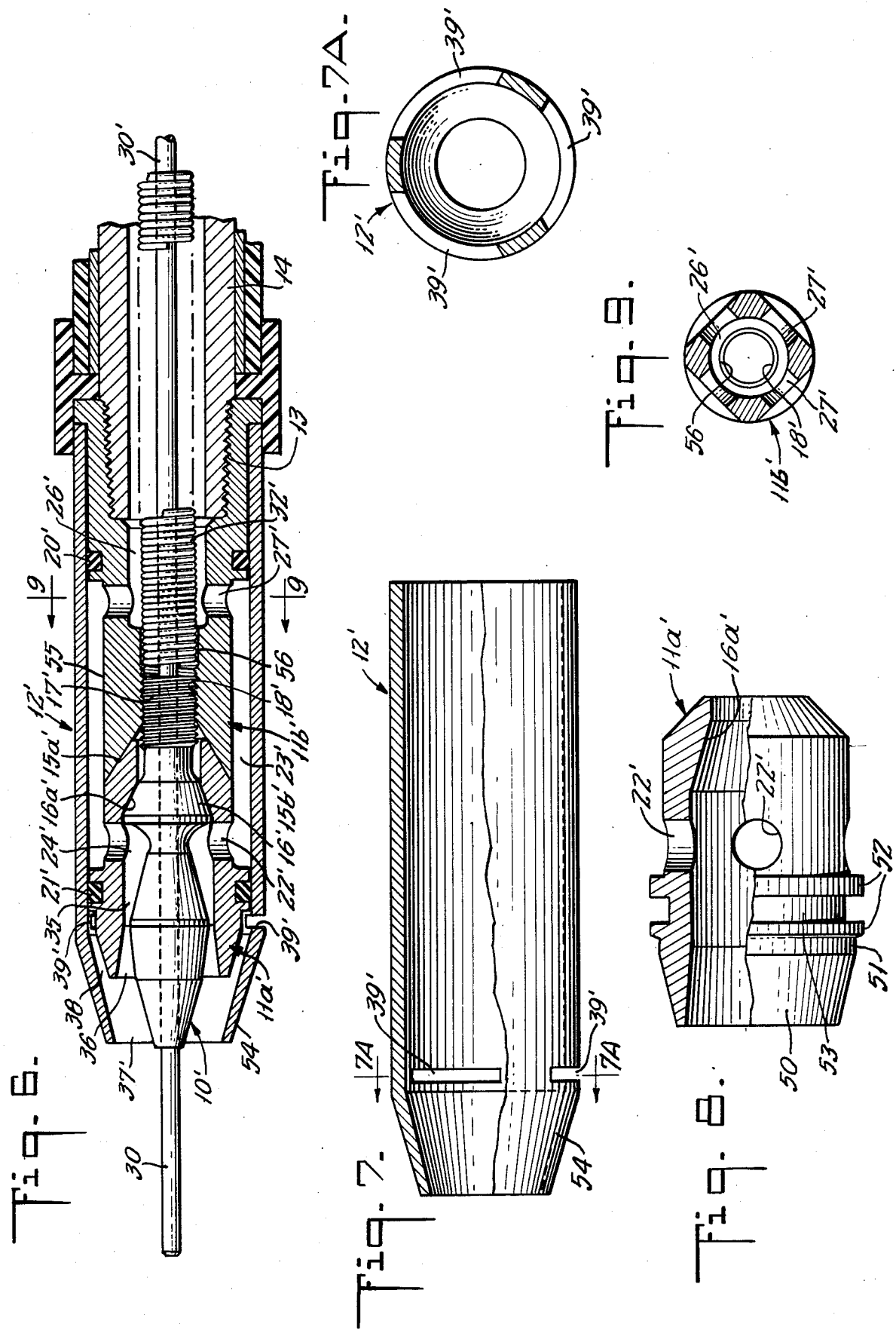

GAS-CONSTRICTED ARC NOZZLE

RELATED CASE

This application is a continuation-in-part of copending application, Ser. No. 824,525, filed Jan. 31, 1986.

BACKGROUND OF THE INVENTION

The invention relates to gas flow in aid of the arc discharge of an electric-arc discharge device, wherein the arc discharge is established to a workpiece which is electrically conductive.

Cutting and gouging are common uses of electric-arc discharge devices. With some processes, to do a clean piece of work has been almost impossible due to accumulation of dross products on the workpiece. Efforts to avoid this problem have involved use of gas jets, variously arranged, depending upon the job to be done. For example, to gouge a channel on the exposed face of a workpiece, plural gas jets have been clustered beneath the electrode tip of the device, the jets being directed at the region of arc discharge to the workpiece, all in the hope and expectation of removing a maximum quantity of arc-melted metal. However, as a practical matter, whether the plural jets are clustered beneath the electrode, or circumferentially distributed around the electrode, as in Bulgarian Pat. No. 51,405, published Feb. 15, 1983, the arc discharge is noisy and the worked product is encumbered by dross which includes hardened droplets of melt of workpiece material, strongly adhered to the workpiece, or excessive fuming is encountered. And this is so even when operating the torch with a consumable, automatically fed electrode, whereby to enhance the ability to develop thermal energy at the point of arc delivery to the workpiece; a discussion of such consumable electrodes is contained in pending patent applications Ser. Nos. 780,031 and 780,033, filed Sept. 25, 1985.

BRIEF STATEMENT OF THE INVENTION

It is an object of the invention to provide a new and improved method and means for utilizing gas flow to shape and position the discharge of an electric arc.

A specific object is to realize the above object in a manner to establish relatively quiet and stable arc action, while accumulating next to no dross, and with much-reduced fuming, as compared with prior techniques.

Another specific object is to realize the above objects while at the same time enabling adjustably controllable constriction of the arc, at far greater offset from the gas nozzle than has hitherto been possible, to thereby provide better visible access for viewing arc action on the workpiece.

A further specific object is to provide a nozzle configuration of general utility in application to an electric-arc discharge device whereby the same nozzle can serve for realizing the above objects, for a variety of operations, including sheet-metal cutting and workpiece gouging.

A general object is to achieve the foregoing objects with a construction enabling much faster and more efficient electric-arc discharge operations, while also substantially extending the limits within which electric-arc discharge operations are feasible.

The invention achieves the foregoing objects in an electric-arc discharge device wherein an annular nozzle surrounds the electrode and is configured for discharging gas flows at trans-sonic speeds, with circumferential uniformity of the gas flow around the axis of the electrode, and directed downstream to surround and radially inwardly confine and shape the arc. The trans-sonic speeds of gas discharge are the result of special annular gas-nozzle design and suitable pressure of gas supply thereto, whereby a region of criticality characterizes gas flow within the nozzle, i.e., prior to discharge at trans-sonic speeds, which are to be taken to range from high subsonic to relatively low supersonic, at discharge around the electrode and toward the region of electric-arc development.

In a particularly advantageous general-purpose embodiment of the invention, means are provided for additionally developing a further annulus of discharged gas flow, concentrically around the trans-sonic velocity flow and in the same axial direction, but at lesser gas-flow rate, whereby pressure of arc-confining gas flow can be controlled in surrounding adjacency to the electrode and its arc, and whereby the action of atmospheric pressure on the trans-sonic annular flow can be buffered by said further annulus of gas flow.

DETAILED DESCRIPTION

The invention will be illustratively described in detail for several embodiments, in conjunction with the accompanying drawings, in which:

FIG. 1 is a view in longitudinal section through an electrode nozzle for general purpose use;

FIG. 2 is an exploded view in longitudinal section of three internal components of the configuration of FIG. 1;

FIG. 3 is a view similar to FIG. 1, for a different embodiment, representing essentially a single-purpose use;

FIG. 4 is a view similar to FIG. 2, for the corresponding three internal components of the configuration of FIG. 3;

FIG. 5 is a fragmentary view in longitudinal section, to show an alternative construction;

FIG. 6 is a view similar to FIG. 1, to show a modification;

FIGS. 7 and 7A are respectively a partly sectioned longitudinal elevation and a cross-section for one of the parts of FIG. 6, the cross-section being taken at 7A—7A in FIG. 7;

FIG. 8 is a partly sectioned longitudinal elevation of another part of FIG. 6; and FIG. 9 is a cross-section taken at 9—9 in FIG. 6, for another of the parts of FIG. 6.

The electrode-nozzle construction of FIG. 1 comprises an electrode member 10, a two-part body member 11a–11b and a shroud member 12 in mutually supported concentric relation about a central axis which extends from an upstream end to a downstream end of the nozzle. The body member is tubular and has internal threads 13 at its upstream end for connection to the outlet 14 of a host torch. The body member is also configured for removable support of the upstream end of electrode member 10, whereby the downstream remainder of the electrode member derives cantilevered support from the body member over at least an axially downstream nozzle region A of circumferentially continuous radially spaced overlap with the body member.

In the form shown, the body-member parts 11a–11b have complementary frusto-conical adjacent ends 15a–15b the electrode member 10 and body part 11a have complementary frusto-conical formations 16–16a, and the electrode member 10 is threaded at its upstream end 17 for removable engagement to the threaded downstream end 18 of body part 11b, whereby close tolerance of concentricity between lapped body-member and electrode-member surfaces is assured upon completion of the thread engagement at 17–18. In this connection, it is noted that the relatively gentle convergence angle $a_1$ of conical surfaces 16–16a, compared to the steeper and opposite convergence angle $a_2$ of conical surfaces 15a–15b enables relatively great torsional friction to develop at 16–16a, thereby facilitating disengagement of threads 17–18 upon relative rotation of the body-member parts 11a–11b, i.e., without having to apply a tool of any kind to the electrode member.

The shroud member 12 is elongate and tubular and establishes an electrically insulated circumferential enclosure of the electrode and body members; member 12 may be a single piece of suitable molded plastic, but as shown it is a metal tube with a tubular liner 19 of insulating material such as a fiber-glass reinforced plastic. At its downstream end, shroud member 12 converges conically, in concentrically spaced relation with the downstream end of the body member and with the downstream end of the electrode member 10. Shroud-member support on the body member is via upstream and downstream lands 20–21 which are peripherally grooved for an elastomeric O-ring seal 20'–21' of each land engagement. Between the lands 20–21, the body member is of reduced diameter to thereby define with shroud liner 19 an annular manifold 23 for gas-flow supply via plural radial ports 22 to a plenum 24 at the upstream end of the region A of spaced concentric overlap of electrode member 10 by the downstream end of the body member. A suitable supply 25 of pressurized gas is schematically shown to be connected to the host torch and to be fed via the outlet 14 to the upstream counterbore region 26 of the body member and then, via plural radial ports 27, to the manifold 23.

The host-torch outlet 14 will be understood to be electrically conductive and to be connected to an electrical source 28 of arc-supply power. Both parts of the body member may also be conductive, suitably of brass, and part 11b is the means of applying arc power to electrode member 10.

If the arc to be struck to a conductive workpiece (not shown) is to involve a non-consumable electrode, then electrode member 10 may be internally configured for releasably chucked retention of a suitable electrode rod, projecting at substantial downstream offset beyond electrode member 10, as shown for the projecting rod end 30 in FIG. 1; alternatively, the electrode member 10 may be of suitable high-temperature alloy and integrally formed with a forwardly projecting tip end from which the arc is to be struck. In the form shown, however, electrode member 10 is suitably of copper, with a continuous central bore 31 for forwardly cantilevered support of a consumable electrode rod or tube, as of the nature disclosed in said pending patent applications, in which case the numeral 30 will be understood to identify the visibly exposed end of the electrode rod or tube; in this event, rod 30 will be understood to be continuously fed from the host torch, being shown at 30' to be continuously guided within a Bowden-wire flexible sheath 32 which derives central piloting support via the concave axially inner-end wall 33 of body-member cavity 26.

It is an important feature of the invention that, within the nozzle region A, axially lapped concentric surfaces of the electrode member and of the body member coact to define an annular supersonic nozzle which is characterized by a circumferentially continuous annular throat at the constricted downstream end of a zone 35 of convergence from plenum 24, the convergence being such, in conjunction with the gas-flow rate and pressure available from supply 25, that critical flow is established at the throat; generally involved supersonic velocities are in the range Mach 1 to Mach 3. As shown, the circumferentially continuous condition is also maintained in a diffuser zone 36 wherein gas velocity increases for discharge at trans-sonic or supersonic velocity into the larger annulus 37 of axial extent B, where the downstream end of the shroud member 12 laps only the downstream convergent end of the electrode member 10. This supersonic-nozzle discharge is in part relied upon, within the annulus 37, to induce a substantial and further gas flow in an annular convergent-passage zone 38, of axial extent C, defined by and between the convex downstream-end taper of the body member and the concave inner-wall taper of the downstream end of shroud member 12. Gas supply to the passage zone may be a suitably regulated pick-off from source 25, or from another gas source, but as shown plural arcuate ports 39 afford induction of ambient air as the gas flow in zone 38.

The net effect and result of the described configuration of FIGS. 1 and 2 is to establish two concentric annular flows at nozzle discharge. The greatest velocity, and therefore lowest pressure, characterizes an inner annulus bounded by the projecting electrode end and by a generally cylindrical margin 40 of adjacency to an outer annulus (within an outer margin suggested at 41) of induced second flow of substantial velocity, which is less than the velocity within the inner annulus 40. Since this second annulus of induced gas flow is of lesser velocity, it must be characterized by pressure which is intermediate near-ambient pressure (at margin 41) and the much lower pressure within annulus 40. Thus, for any transverse section taken along and beyond the projected extent of electrode 30, a substantial and circumferentially uniformly distributed radially compressing pressure gradient exists. This gradient is found to be so circumferentially uniform and strong as to dictate the focus and sectional width of the arc itself, rendering the FIG. 1 configuration useful to gouge or to cut a given workpiece, for the circumstance of compressed air from supply 25, merely by varying the feed-air pressure, the wire (30) feed rate (amperage) and the arc voltage.

The nozzle configuration of FIGS. 3 and 4 is preferred for the single purpose application of cutting a sheet-metal workpiece, as when delineating a locally damaged vehicle-body panel area for removal and replacement. FIGS. 3 and 4 also illustrate an alternative technique for removably mounting an electrode member 110 to a body member, which again comprises two parts 111a–111b. For simplicity of description, parts of the electrode nozzle of FIGS. 3 and 4 which correspond to those of FIGS. 1 and 2 are identified by the same reference numbers, in a 100-series.

In terms of the FIG. 3/4 alternative mounting of electrode member 110, the upstream end thereof is characterized by a radial shoulder 101 at the base end of a frusto-conical mounting head 116, which derives coaxial positioning reference from a complementary concave frusto-conical seating surface 116*b* in body-member part 111*b*. To retain the seated relation, the bore of body-member part 111*a* is characterized by a radially inward shoulder 102 which axially drives head 116 into seated position, upon relative rotation of parts 111*a*-111*b* to advance their threaded engagement at 103-104. Flats 105 on part 111*a* and on the flanged end 106 of part 111*b* will be understood to facilitate wrenched fastening and release of the seated relation of head 116.

For the primarily cutting purpose to be served by the nozzle electrode of FIGS. 3 and 4, it is preferred to characterize the supersonic-nozzle region so that, beyond the critical-flow region at the throat, and in the expanding zone 136, the mean radius of supersonic flow is convergent in the downstream direction. This convergence, in the context of elevated pressure of gas-flow supply to the plenum for the annular supersonic nozzle, is found to provide such strong and well-focused delivery of supersonic flow along an annulus closely adjacent the consumable electrode 30, for at least as much axial distance as 5 times the mean exit diameter of zone 136, as to require no additional pinch-control effect from any other annular flow. The downstream end of shroud member 112 of FIG. 3 therefore is for protection purposes only, in that no flow can be induced therein, beyond the supersonic discharge from zone 136. And the radially compressed arc struck from this nozzle provides a very stable and narrow path of line-cutting of a metal workpiece.

The embodiment of FIG. 5 provides all the performance features of FIGS. 1 and 2, and is solely illustrative of the employment of a one-piece body member 11, which is counterbored from its downstream end to match the taper of the frusto-conical seating surface of electrode member 10, and which is suitably tapped for threaded reception of the upstream end 17 of the electrode member 10.

Illustrative dimensions will be given for the convergent/divergent zones of the supersonic-nozzle portions of the respective embodiments of FIGS. 1 (5) and 3, for the case of connection to a host-torch output bore of 0.75-in. diameter, a shroud-member diameter of 0.875 inch, and an assembled electrode-nozzle length of 3 inches, within which the annular supersonic-nozzle portion is of 0.50-inch axial length, i.e., the overall length (A) spanned by ends of its zones 35 and 36. In the configuration of FIGS. 1 and 5, the throat is at the half-way point, and the zone 35 is defined by a 0.375-in. diameter cylindrical bore in part 11*a*, and by a convex frusto-conical surface (of electrode member 10) which slopes at 15° from the longitudinal axis, to a maximum diameter which establishes a 0.012-inch, circumferentially continuous annular clearance at the throat; the mean slope of the convergent zone 35 is thus an expanding cone of 7.5° slope. Downstream from the throat, the bore in part 11*a* slopes outward at 5°, and the lapped convex frusto-conical surface of electrode member 10 slopes at substantially 6°, so that the mean slope of the divergent zone 36 is a very slightly converging cone. At its point of discharge into the zone 37 of inducing further gas flow from passage 38, the discharge area from zone 36 is preferably in the range 1:1 to 1:5 as compared to the area of passage 38 at entry into zone 37.

In an illustrative case of the primarily cutting embodiment of FIG. 3, the overall length of the annular supersonic-nozzle configuration is again 0.50 inch, but the bore at the throat is of 0.281-in. diameter, the same being located on the upstream side of the midpoint so as to provide a convergent zone 135 of 0.18-in. length and a divergent zone 136 of 0.32-in. length. The convergent zone 135 is characterized by virtually zero mean slope, but the divergent zone is characterized by a mean slope with converges at 2.5° in the downstream direction, whereby to achieve greater confinement of its supersonic-flow discharge along the electrode 30 and in radial compression of the arc struck therefrom.

The described configurations will be seen to achieve the stated objects. Although instrumentation has not been available to make exact measurement of flow speeds, it can be said that the supersonic nozzle of the FIG. 1 configuration is designed theoretically to produce an exit velocity of Mach 2.63 with as low as 5-psi pressure differential over the axial span A of the supersonic-nozzle region of zones 35 and 36. The induced-flow nozzle is configured to employ like opposed concave and convex slopes to establish an induced-flow passage of section area which converges along a single outer confining surface, from its largest area at ambient-air entry, to the inside pocket which characterizes zone 37. This enables the induced-air flow to enter zone 37 in coaxial relation to the greater speed of discharge flow from the supersonic nozzle. The converging subsonic coaxial flow of the induced air coacts with the convergent tip of the electrode member 10 (reducing to the diameter of the electrode wire 30) to restrain deceleration of the higher-velocity flow from the supersonic nozzle, while drawing the higher-velocity flow smoothly down to the electrode wire 30. The induced-air flow provides a protective or sacrificial coaxial sheath of high-speed flow which reduces or moderates the compressive effects of atmospheric air on the primary flow; it also delays, and therefore axially offsets beyond the torch, the flow-degrading effect of turbulence. A side benefit is that overall air flow is increased without need for additional high-pressure air; indeed, the result is a lesser volumetric demand for high-pressure air flow. In tests to date, the FIG. 1 (5) configuration has provided easily variable thrust compression of the arc, by varying air-feed pressure at 25. The resulting electric arc is quiet and stable, producing uniform displacement of melted workpiece metal, with reduced fuming (because most displaced melted metal is not atomized), and with little or no adhering dross. The reduced feed-air volume requirement is accompanied by superior control of gouging and cutting operations, it being possible to control the degree of arc-thrust constriction, and therefore width of the arc, over a 10:1 range of pressures (10 psi to 100 psi) as delivered by the source 25.

The modification of FIGS. 6 to 9 embodies certain refining features which render the same preferred over the construction of FIGS. 1 and 2, and these features will be seen to be additionally applicable to the constructions of FIGS. 3 to 5. To simplify description, and where applicable, parts in FIGS. 6 to 9 which correspond to parts in FIGS. 1 and 2 are given the same reference number, with primed notation.

The most striking FIG. 6 departure from FIG. 1 is the use of a single all-metal shroud member 12' which is preferably of aluminum, with a so-called hard-anodized finish or coat. The hard-anodized coat is so thin, approximately 0.002-in. thick, that it cannot realistically be shown in the drawing. But with such a coating, the inner and outer surfaces of shroud member 12' are tough, fracture-resistant and scratch-resistant; and, most importantly, there is no need for the electrically insulative liner 19 of FIG. 1, in that such hard-anodizing results in superior dielectric properties, which are in the order of 1000 volts/mil of anodized thickness.

As best seen in FIGS. 6 and 8, the downstream frusto-conical convex profile 50 of body member 11a' is cut away to define a circumferentially continuous land 51 adjacent the land 52 of downstream support of shroud member 12', such support being completed at sealed fit of O-ring 21' in the groove 53 of land 51; land 51 is in axial registry with the arcuate-port formations 39' of shroud member 12', thereby establishing a circumferentially continuous plenum for induced air flow via ports 39', prior to axially directing and accelerating such air flow in zone 38' between the convergent shroud-member end 54 and the lapped profile 50 of body member 11a'. Body member 11a' is also preferably of aluminum, with a hard-anodized coat as described for the anodized coat of shroud member 12'.

Further differences in the FIG. 6 construction will be seen in the provision of extended axial length of the threads 17' at the upstream end of electrode member 10', which is suitably of copper, being of course relied upon for establishing continuous good electrical-supply connection to the continuously fed consumable electrode 30. For fidelity of such electrical-supply connection, the other body part 11b' is highly conductive, suitably of brass, and the axial extent of threaded engagement to electrode member 10' is deliberately great, for assurance of good electrical power delivery to member 10'.

In FIG. 6, the electrode-member fit (16'/16a') to body member 11a' remains as described for 16/16a in FIG. 1, but the direction of steep frusto-conical engagement 15a'-15b' reversed from that at 15a-15b in FIG. 1. The reason for the reversal is that the body-member conical surface 16a', being hard-anodized, is a hard surface compared to that of the relatively soft copper of the electrode-member surface 16' which it engages. It is found that this combination of relatively hard to relatively soft surfaces, at electrode-centering engagement, establishes such friction as to preclude inadvertent vibrational loss of the engagement; in fact, for having merely hand-tightened electrode member 10' into threaded engagement with body member 11b', and with the other body member 11a' engaged therebetween, the locked assembly of these parts is so great as to require wrenched engagement to flats 55 of body member 11b' (see FIGS. 6 and 9), in order to dislodge the locked relation, the lock at 16'-16a' being so strong that unthreading torque applied to body members 11a'/11b' is effectively an unthreading torque applied to electrode member 10' with respect to body member 11b'.

A still further feature of FIG. 6 departure from FIG. 1 is the provision of an intermediate cylindrical counterbore 56 in body member 11b', the same being axially intermediate threads 18' and the larger plenum-defining counterbore 26'. The counterbore 56 will be seen to establish an axial guide for the downstream end of the Bowden-cable sheath 32', so that this downstream end will remain concentrically located regardless of such displacements of sheath 32' as may occur by reason of manipulation of the torch body to which the described electrode-nozzle configuration is mounted. Preferably, the Bowden-cable sheath 32' is coated with low-friction flexible plastic, such as a shrink-plastic coating for substantially sealed and smooth engagement in counterbore 56, thus avoiding pressurized-gas leakage via clearance between the consumable electrode 30 and the electrode-member bore 31 (see FIG. 2) in which it is guided, it being appreciated that any such leakage can degrade the continuity and/or fidelity of electrical-power delivery to the consumable electrode 30. Also preferably, the downstream end of cable sheath 32' is formed rounded or with a bevel (not shown), for ease of initial self-piloting entry into counterbore 56.

The construction of FIG. 6, particularly with its use of hard electrically insulative coating on shroud member 12' and body member 11a', is found to produce a truly surprising result, which is best appreciated in the event of a gouging entry of the gas-constricted arc in close proximity to workpiece material. In such circumstances, some of the particulate metal which is dislodged as metal droplets in the gouging process can find its way back to the vicinity of the arcuate induced-air ports 39 of FIG. 1 and, in FIG. 1, dross deposit of the particulate material can accumulate upon one or the other of the convergent surfaces which define the convergent induced-air passage 38. Not only does such dross accumulation spoil the intended flow of induced air, but a potential short-circuit path develops from electrode member 10 to shroud member 12, should the latter happen to contact the workpiece, or other electrical ground; and any such short-circuit path can be totally destructive of the discharge end of the nozzle configuration. On the other hand, with the FIG. 6 construction, any workpiece or other electrical-ground contact with shroud member 12' must necessarily be a contact that is electrically well protected by the dielectric strength of the hard-anodized coating. Further, dross accumulation within internal passages is virtually non-existent, perhaps because the anodized surfaces of members 11a' and 12' have a greatly elevated melting temperature (which exceeds any temperature of the particulate material, and these surfaces do not offer heat-sink properties to the entrained particulate material, so that there is little or no encouragement for any particulate material to adhere to such surfaces. Also, the much faster inner annulus of trans-sonic flow discharge, concentrically within the annular discharge of induced air flow into zone B, is such that no entrained particulate material could possibly reach the electrode member 10' of FIG. 6.

The inherent dielectric strength of the anodic film which coats the shroud member 12' and the body member 11a' provides insulative properties which prevent nozzle destruction by arcing between these parts. And the virtual elemination of particle accumulation within the nozzle insures that aerodynamic integrity of the nozzle will be maintained, thereby providing uniform performance and extended life.

Although in the case of FIG. 6, the preference has been indicated for a hard-anodic coating, it should be noted that much the same desired dielectric-coat properties may be achieved by other techniques such as ceramic coatings, and epoxy or other resin-based coatings. The preference for anodic coating is attributable to inherently low cost and precision of the process, with degradation of the aerodynamic properties which are essential to trans-sonic nozzle performance.

Also, in connection with FIG. 6, the fact that aluminum is indicated to be suitable for the shroud 12' and for body-member part 11a' does not mean that aluminum is necessarily to be preferred for all shrouded torch configurations. For example, in the FIG. 6 embodiment, aluminum well serves the purpose because the gas-constricted arc configuration is in the nature of a refrigerator, producing such cooling action that a relatively low melting metal such as aluminum is not deleteriously affected. On the other hand, a conventional fixed-electrode torch with a shielding-gas shroud must use a shroud material which can withstand temperatures that could melt aluminum; often, such shrouds are of ceramic, which is necessarily subject to breakage, but a hard anodic coating applied to a titanium shroud will provide not only the desired dielectric strength but also a tough structure with greatly enhanced resistance to mechanical shock, as well as the above-noted resistance to spatter or dross accumulation.

What is claimed is:

1. An electrode-shielding nozzle for use in gas-flow focusing of an electric-arc discharge to a conductive workpiece, said nozzle comprising:

an electrode member, a body member, and a shroud member in mutually supported concentric relation about a central axis which extends from an upstream end to a downstream end of the nozzle;

said body member being at least in part tubular and having means upstream from its downstream end for removable support of the upstream end of said electrode member, whereby the downstream remainder of said electrode member derives cantilevered support from said body member over an axially downstream extending annular region of circumferentially continuous radially spaced overlap with said body member;

said annular region being characterized by an annular plenum portion that is upstream from and communicates with an annular region of continuous convergence to an annular throat portion; and said shroud member being elongate and tubular and being coated with dielectric material to thereby establish an electrically insulated circumferential enclosure of said electrode and body members.

2. The nozzle of claim 1, in which said body member comprises axially separable upstream and downstream parts having frusto-conical axially abutting ends, and means for releasably retaining said body-member parts in abutting relation, said means including a threaded engagement between said electrode member and said upstream part and an axially-abutting relation between formations of said electrode member and said downstream part.

3. The nozzle of claim 2, in which the downstream one of said body-member parts is also coated with dielectric material.

4. The nozzle of claim 1, in which said shroud member is of aluminum and said dielectric material is a hard-anodized coating of said shroud member.

5. The nozzle of claim 3, in which said shroud member and the downstream one of said body-member parts is of aluminum, and in which the said dielectric material is a hard-anodized coating on both said shroud member and said downstream one of said body-member parts.

6. An electrode-shielding nozzle for use in gas-flow focusing of an electric-arc discharge to a conductive workpiece, said nozzle comprising:

an electrode member, a body member, and a shroud member in mutually supported concentric relation about a central axis which extends from an upstream end to a downstream end of the nozzle;

said body member being at least in part tubular and having means upstream from its downstream end for removable support of the upstream end of said electrode member, whereby the downstream remainder of said electrode member derives cantilevered support from said body member over an axially downstream extending annular region of circumferentially continuous radially spaced overlap with said body member, said annular region being characterized by an annular plenum portion that is upstream from and communicates with an annular region of continuous convergence to an annular throat portion;

said shroud member being elongate and tubular and establishing an electrically insulated circumferential enclosure of said electrode and body members.

7. An electrode nozzle for use in an electric-arc discharge to a conductive workpiece, said nozzle comprising:

an electrode member, a body member and a shroud member of conductive member in mutually supported concentric relation about a central axis which extends from an upstream end to a downstream end of the nozzle;

said body member being at least in part tubular and having means upstream from its downstream end for removable support of the upstream end of said electrode member, whereby the downstream end of said electrode member derives cantilevered support from said body member over an axially extending annular region beyond said body member, said annular region being characterized by an annular plenum portion that is upstream from and communicates with an annular region of continuous convergence to an annular throat portion;

said shroud member being elongate and tubular and defining an axially extending region of circumferentially continuous radially spaced overlap with said electrode member, and said shroud member being coated with dielectric material to thereby establish an electrically insulated circumferential enclosure of said electrode and body members.

8. The electrode nozzle of claim 7, wherein said body member has a central through-passage and is adapted to provide guided support of a consumable-electrode material fed therethrough.

9. The nozzle of claim 1 or claim 6, in which gas-flow supply-passage formations defined by and between said body member and said shroud member communicate with said plenum portion, said passage formations having sufficient capacity to enable establishment of critical flow of gas at said throat portion.

10. The nozzle of claim 1 or claim 6, in which said throat portion is but a fraction of the axial extent of said annular region.

11. The nozzle of claim 1 or claim 6, in which said body member is a single piece of conductive material and said electrode member is engaged to said body member.

12. The nozzle of claim 1 or claim 6, in which said electrode member has a generally conical tip at its downstream end.

13. The nozzle of claim 1 or claim 6, in which said electrode member has a central bore along its axis for concentric feed of powder material passing therethrough.

14. The nozzle of claim 1 or claim 6, in which said electrode member has a central bore along its axis for concentric piloting support of and electrical contact with a consumable electrode passing therethrough.

15. The nozzle of claim 1 or claim 7 or claim 6, in which gas-flow supply-passage formations defined by and between said body member and said shroud member communicate with said plenum portion, said passage formations having sufficient capacity to enable establishment of critical flow of gas at said throat portion, and in which said gas flow supply-passage formations include a further annular plenum-defining region defined by and between said body member and said shroud member and by axially spaced upstream and downstream elastomeric annular seals between said body member and said shroud member, the downstream seal being at an axial location of downstream offset from the region of body member support of said electrode member, and a plurality of radially spaced ports in said body member and within said offset for gas communication from said further plenum region to said first mentioned plenum portion.

16. The nozzle of claim 1 or claim 6, in which said annular region is continuously divergent downstream of said throat.

17. The nozzle of claim 1 or claim 7 or claim 6, in which said body member comprises axially separable upstream and downstream parts having frusto-conical axially abutting ends, and means for releasably retaining said body-member parts in abutting relation, said means including a threaded engagement between said electrode member and said upstream part and an axially-abutting relation between formations of said electrode member and said downstream part.

18. The nozzle of claim 1 or claim 7 or claim 6, in which said body member comprises axially separable upstream and downstream parts having frusto-conical axially abutting ends, and means for releasably retaining said body-member parts in abutting relation, said means including a threaded engagement between said electrode member and said upstream part and an axially-butting relation between formation of said electrode member and said downstream part, said last-mentioned formations being complementary and frusto-conical.

19. The nozzle of claim 7 or claim 6, in which said body member comprises axially separable upstream and downstream parts having axially threaded removable engagement, said body-member parts and said electrode member having coacting formations to retain and provide the cantilevered support of said electrode member when said body-member parts are in threaded engagement.

20. The nozzle of claim 1 or claim 7 or claim 6, in which said body member comprises axially separable upstream and downstream parts having axially threaded removable engagement, said body-member parts and said electrode member having coacting formations to retain and provide the cantilevered support of said electrode member when said body-member parts are in threaded engagement, said coacting formations including complementary frusto-conical surfaces on the upstream end of said electrode member and on at least one of said body-member parts.

21. The nozzle of claim 1 or claim 7 or claim 6, in which gas-flow supply-passage formations defined by and between said body member and said shroud member communicate with said plenum portion, said passage formations having sufficient capacity to enable establishing of critical flow of gas at said throat portion, and in which said gas-flow supply-passage formations include a further annular plenum-defining region defined by axially spaced upstream and downstream elastomeric annular seals between said body member and said shroud member, the downstream seal being at an axial location of downstream offset from the region of body member support of said electrode member, and a plurality of radially spaced ports in said body member and within said offset for gas communication from said further plenum region to said first-mentioned plenum portion, said body member being formed at its upstream end for removable connection to the gas-feeding gun neck of a host torch, and in which said body member has a plurality of spaced radial ports located upstream of the location of electrode-member support and downstream from the location of the upstream elastomeric seal.

22. The nozzle of claim 1 or claim 7 or claim 6, in which the downstream end of said body member is at upstream offset from the downstream ends of said electrode member and of said shroud member, whereby annular-region discharge is into an axially extending annular volume defined by radial clearance between said electrode member and said shroud member.

23. The nozzle of claim 6, in which the downstream end of said body member is at upstream offset from the downstream ends of said electrode member and of said shroud member, whereby annular-region discharge is into an axially extending annular volume defined by radial clearance between said electrode member and said shroud member, there being an annular clearance of at least some radial and axial extent between said shroud member and said body member at the downstream end of said body member, and one or more port formations in said shroud member at the upstream end of said annular clearance for induction of inlet flow of a gas for downstream-directed passage through said annular clearance.

24. The nozzle of claim 23, in which the annular clearance is characterized by convergent section area in the downstream direction.

25. The nozzle of claim 24, in which the downstream-discharge section area of said annular clearance is at least the same order of magnitude as the downstream-discharge area of said annular region.

26. The nozzle of claim 25, in which the area ratio of the first-mentioned area to the second-mentioned area is in the range of substantially 1:1 to 5:1.

27. The nozzle of claim 1 or claim 7 claim 6, in which the section area relation between said plenum portion and said throat portion is in the range 2:1 to 10:1.

28. The nozzle of claim 1 or claim 7 or claim 6, in which the section-area relationship between said throat portion and the downstream end of said annular region is in the range 1:1.05 to 1:5.

* * * * *